United States Patent [19]

Adachi et al.

[11] Patent Number: 4,720,152

[45] Date of Patent: Jan. 19, 1988

[54] ANTI-SKID DEVICE FOR MOTOR VEHICLES

[75] Inventors: Yoshiharu Adachi, Gamagori; Takumi Nishimura, Chiryu; Tadao Saito, Nagoya; Nobuyasu Nakanishi; Noboru Noguchi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 881,700

[22] Filed: Jul. 3, 1986

[30] Foreign Application Priority Data

Jul. 5, 1985 [JP] Japan ................... 60-148586

[51] Int. Cl.$^4$ ............ B60T 8/40; B60T 8/34; B60T 8/42
[52] U.S. Cl. ......................... 303/113; 303/10; 303/115; 303/116
[58] Field of Search ............ 303/10, 11, 92, 91, 303/115, 116, 117, 119, 113, 6 C

[56] References Cited

U.S. PATENT DOCUMENTS

| | | | |
|---|---|---|---|
| 4,605,263 | 8/1986 | Ando et al. | 303/116 |
| 4,618,188 | 10/1986 | Nishimurd et al. | 303/116 |
| 4,636,010 | 1/1987 | Adachi et al. | 303/116 |

Primary Examiner—Andres Kashnikow
Assistant Examiner—Timothy Newholm
Attorney, Agent, or Firm—Oblon, Fisher, Spivak, McClelland & Maier

[57] ABSTRACT

An anti-skid device for motor vehicles provided with a hydraulic circuit for connecting the brake master cylinder with the wheelbrake cylinder has a valve dividing the hydraulic circuit into a brake master cylinder side section and a wheelbrake cylinder side circuit section, the two circuit sections being arranged so as to act against each other. Two floating pistons make slidable reciprocating movement respectively according to the pressure difference between the two hydraulic circuit sections and the spring force. The anti-skid device causes the brake pedal to generate a vibration of adequate degree at the time of anti-skid operation in any road condition so that the drive can recognize the actuation of anti-skid.

5 Claims, 4 Drawing Figures

ANTI-SKID DEVICE FOR MOTOR VEHICLES

BACKGROUND OF THE INVENTION

1. Field of the Invention

The invention relates to an anti-skid device for motor vehicles, particularly to an anti-skid device for motor vehicles which comprises a first valve disposed in a hydraulic circuit and selectively dividing the hydraulic circuit connecting a brake master cylinder with a wheelbrake cylinder into a master cylinder side hydraulic circuit and a wheelbrake side hydraulic circuit; a hydraulic pressure source generating working fluid pressure by a driving force; a pressure reducing piston for opening and closing the first valve by a forward movement from its inactive position caused by hydraulic pressure of the wheelbrake cylinder side hydraulic circuit and a backward movement to its inactive position caused by the working fluid pressure and thereby increasing or decreasing the capacity of the wheelbrake cylinder side hydraulic circuit; and a second valve for supplying the working fluid pressure to the pressure reducing piston when the wheel is rotating in a normal condition in order to make the piston to be in its inactive position against the hydraulic pressure of the wheelbrake cylinder and for releasing the working fluid pressure from the pressure reducing piston when the wheel is about to be locked in order to move the piston forward by means of the hydraulic pressure of the wheelbrake cylinder side hydraulic circuit, and said anti-skid device is so constructed that the driver of the vehicle can recognize the actuation of the anti-skid device through a vibration of brake-pedal which generates according to the change of hydraulic pressure degree at the wheelbrake cylinder side hydraulic circuit when the anti-skid device is actuated.

2. Prior Art

The conventional anti-skid device of the type which is constructed so that a brake-pedal vibrates when the anti-skid device is actuated and thereby the driver can recognize the actuation of the anti-skid device, is disclosed, for example, in Japanese Laid-open Patent Specification No. 79450/1984 (Jitsu-kai-sho 59-79450). In the device disclosed in the above specification, a brake master cylinder and a wheel brake cylinder are hydraulically connected by an interposed floating cylinder, and a working fluid chamber is formed by the floating piston. When the anti-skid device is actuated, the capacity of the wheel brake cylinder side hydraulic circuit is increased and decreased by supplying to or taking from the floating piston the working fluid pressure, thereby the hydraulic pressure in the wheel brake cylinder side hydraulic circuit being controlled so as to be increased and decreased. Consequently, at the time of actuation of the anti-skid device, the capacity of the brake master cylinder side hydraulic circuit varies by a sliding movement of the floating piston, which causes the brake-pedal to generate vibration.

In the above conventional device, however, the sliding degree of the floating piston has to be set so as to satisfy the control efficiency of the hydraulic pressure of wheel brake cylinder side. This might cause a problem that the vibration amplitude of brake-pedal becomes too large due to the excessive change of the capacity of the master cylinder side hydraulic circuit caused by the sliding movement of the floating piston.

SUMMARY OF THE INVENTION

The object of the present invention is to provide an anti-skid device which is constructed so that the vibration degree of the brake pedal at the time of actuation of the anti-skid device can be set optionally.

In accordance with the present invention, the antiskid device of the type having a construction stated in the foregoing is further provided with a first floating piston and a second floating piston. The first floating piston is so arranged as to slide by a determined degree by means of causing the hydraulic pressure of the brake master cylinder side hydraulic circuit to act against the hydraulic pressure of the wheel brake cylinder side hydraulic circuit as well as causing the force of the first spring to act against the hydraulic pressure of the brake master cylinder side hydraulic circuit. The second floating piston is so arranged as to slide by a predetermined degree by means of causing the hydraulic pressure of the brake master cylinder side hydraulic circuit to act against the hydraulic pressure of the wheel brake cylinder side hydraulic circuit as well as causing the force of the second spring to act against the hydraulic pressure of the brake master cylinder side hydraulic circuit In an anti-skid device, no change of the hydraulic pressure would arise in the brake master cylinder side hydraulic circuit at the time of actuation of the anti-skid device if the abovementioned first and second floating piston had not been provided, because the hydraulic pressure circuit connecting the brake master cylinder with the wheel brake cylinder is divided into a brake master cylinder side hydraulic circuit section and the wheel brake cylinder side hydraulic circuit section by the first valve and the capacity of the wheel brake cylinder side hydraulic circuit is increased and decreased, whereby the hydraulic pressure of the wheel brake cylinder side hydraulic circuit is controlled by its increase and decrease. This means that the construction for anti-skid action does not influence the pressure change in the brake master cylinder side hydraulic circuit.

On the contrary, at the time of actuation of the anti-skid device in the case where the first and second floating pistons are provided as in the device of the present invention, the force against the first spring acts upon the first floating piston by the difference of hydraulic pressure between the brake master cylinder side hydraulic circuit and the wheel brake cylinder side hydraulic circuit, while the force against the second spring acts upon the second floating piston by the difference of hydraulic pressure between the brake master cylinder side hydraulic circuit and the wheel brake cylinder side hydraulic circuit The first floating piston makes a reciprocating movement within the range of predetermined sliding degree according to the relationship between the force of the first spring and the force acted by the difference of hydraulic pressure of the brake master cylinder side hydraulic circuit from the wheel brake cylinder side hydraulic circuit. The second floating piston makes a reciprocating movement within the range of predetermined sliding degree according to the relationship between the force of the second spring and the force acted by the difference of hydraulic pressure of the brake master cylinder side hydraulic circuit from the wheel brake cylinder side hydraulic circuit. These sliding displacements of the first floating piston and the second floating piston cause a predetermined capacity change in the brake master cylinder side hydraulic circuit, and this in turn causes a generation of predetermined degree of vibration at the brake pedal. Therefore, the degree of vibration of brake pedal can be set optionally.

Further, as the pressure difference for reciprocating the first floating piston can be different from the pressure difference for reciprocating the second piston, it is possible to arrange the device so that the second floating piston makes the reciprocating action when the anti-skid device is actuated on a slippery road and the first floating piston makes the reciprocating action when the anti-skid device is actuated on a non-slippery road, thereby causing an effect that the vibration of brake pedal is generated adequately in any road condition. Incidentally, in the above former case, the hydraulic pressure of the brake cylinder side hydraulic pressure circuit is increased and decreased within a rather low pressure range and the pressure difference between the brake master cylinder side hydraulic circuit and the wheel brake cylinder side hydraulic circuit is large. On the contrary, in the above latter case, the hydraulic pressure of the wheel brake cylinder side hydraulic circuit is increased and decreased within a rather high pressure range and the pressure difference between the brake master cylinder side hydraulic circuit and the wheel brake cylinder side hydraulic circuit is small.

As stated above, an anti-skid device of the present invention can generate a vibration of adequate degree at a brake pedal in any case, for instance, both in the case where the anti-skid device is actuated on a slippery road and in the case where the anti-skid device is actuated on a non-slippery road, thereby giving the driver a safety feeling on the actuation of the antiskid device.

Other and further objects, features and advantages of the present invention will be understood more clearly and fully from the following detailed description of preferred embodiments with reference to the attached drawings.

DETAILED DESCRIPTION OF A PREFERRED EMBODIMENT

Figure 1:
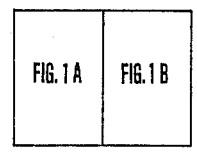
FIG. 1 shows schematically by way of FIGS. 1a and 1b the one embodiment of the present invention with the sectional view of the valve mechanism and the flowline of hydraulic circuits.
Figure 1A:
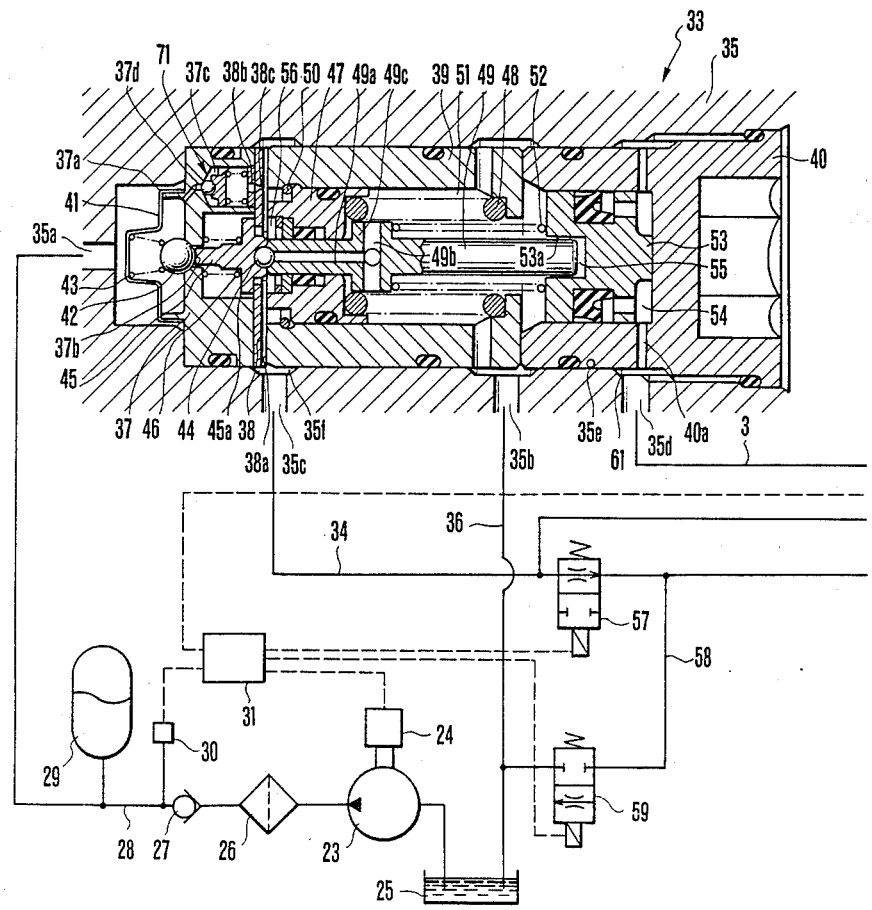
Figure 1B:
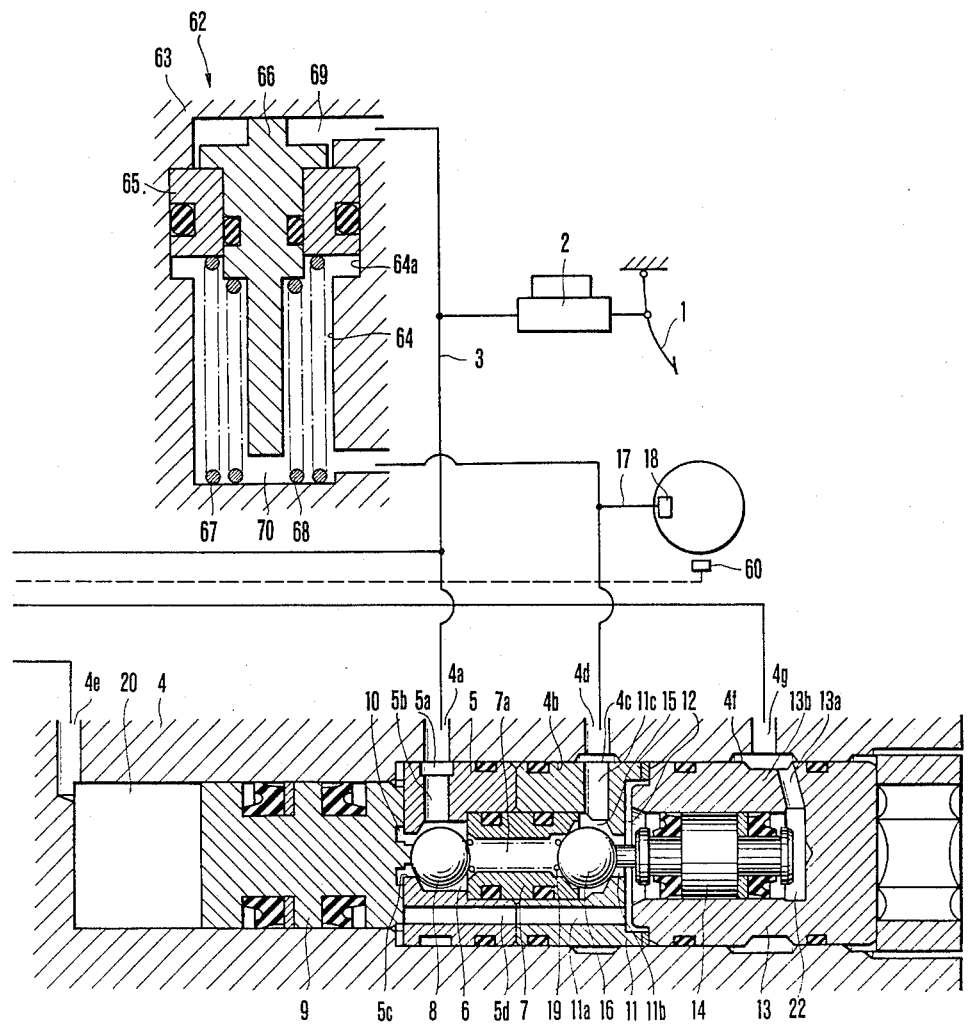

Referring to FIG. 1, the brake master cylinder 2 is coupled operationally with the brake pedal 1 and generates fluid pressure by stepping the brake pedal 1, according to the stepping force. The fluid pressure is applied to the valve chamber 6 in the valve seat 5 by way of the circuit 3, the hole 4a in the body 4, and the annular groove 5a and hole 5b of the valve seat fitted fluid-tightly into the cylinder hole 4b in the body 4. This valve chamber 6 is defined by the valve seat 7 fitted fluid-tightly into the valve seat 5 and, the valve 8 installed in the valve chamber 6 when in its first position, keeps the hole 5c in the valve seat 5 open as shown in the drawing, the fluid pressure applied to the valve chamber 6 is further applied to the chamber 12 on the right side, by way of the hole 5c, the decompression chamber 10 defined on the left side of the valve seat 5 by a pressure reducing piston 9 fitted fluid-tightly and slidably into the cylinder hole 4b, the hole 5d in the valve seat 5, and the hole 11a in the valve seat 11 fitted into the cylinder hole 4b fluid-tightly. This chamber 12 is defined by the closing member 13 fitted fluid-tightly into the cylinder hole 4b, the piston 14 fitted fluid-tightly and slidably into the closing member 13 and the valve seat 11. When the valve 16 installed in the valve chamber in the valve seat 11 closes the hole 7a in the valve seat 7 and opens the hole 11b in the valve seat 11a as shown in the drawing, the fluid pressure applied to the chamber 12 is further applied to the wheel brake cylinder 18 by way of the hole 11b, the valve chamber 15, the hole 11c in the valve seat 11, the annular groove 4c and hole 4d of the body 4, and the circuit 17.

Valves 8 and 16 are biased in a direction away from each other by the spring 19 equipped between the two valves. In the drawing, the pressure reducing piston 9 takes its inactive position and lifts the valve 8 into its first position off the valve seat 5 against the spring 19 to open the hole 5c. Also in the drawing, the piston 14 takes its inactive position and lifts the valve 16 off the valve seat 11 against the spring 19 to open hole 11b but also brings it into contact with the valve seat 7 to close the hole 7a. As will be understood from the explanation in the following paragraphs, the valve seat 5 and valve 8 constitute the aforementioned first valve.

Pump 23 for generating working fluid pressure is driven by an electric motor 24 and sucks fluid from a reservoir 25 and discharges it to a circuit 28 by way of a strainer 26 and check valve 27. To this circuit 28 are connected a gas spring type accumulator 29 and a pressure-sensitive switch 30. This pressure-sensitive switch 30 and motor 24 are connected to an electronic control unit 31 which operates the motor 24 by a signal from the pressure-sensitive switch 30 in such a manner that the working fluid pressure in the accumulator 29 is present within the specified range (175 to 200 kg/cm$^2$) required for the operation of the device. The working fluid pressure in the accumulator 29 is supplied to the circuit 34 by a circuit 28 by way of a regulator valve 33. This circuit 34 is for introducing the working fluid pressure to the working fluid pressure chamber 20 on the left side of the pressure reducing piston 9.

The regulator valve 33 has a body 35 which is provided with a hole 35a communicating with the circuit 28, a hole 35b communicating with the reservoir 25 by way of the drain circuit 36, a hole 35c communicating with the circuit 34, and a hole 35d communicating with the circuit 3. In the cylinder hole 35e in this body 35 are fitted and fixed a valve seat 37, washer 38, piston guide 39, and closing member 40 in sequence, of which the valve seat 37, piston guide 39, closing member 40 and cylinder hole 35e are impervious to fluid. On the left side of the valve seat 37 is provided an annular projection 37a, to which a filter/spring retainer 41 provided with numerous small holes is fitted and fixed, and in this filter/spring retainer 41 are provided a valve 42 which opens and closes the hole 37b in the valve seat 37 and a spring 43 which brings this into contact with the valve seat 37 so as to close the hole 37b.

In a large diameter portion at the right portion of opening 37b of the valve seat, a movable member 45 to which a valve 44 is press-fitted at its right end and a spring 46 for biasing the valve 45 to washer 38 is disposed. The outside diameter of the right end of movable member 45 is smaller than the inside diameter of washer 38, and a flange portion 45a having an outside diameter larger than the inside diameter of washer 38 is formed on movable member 45 in order to limit the rightward movement of movable member 45 by its contact with washer 38.

Into the piston guide 39, a piston 47 is fitted fluid-tightly and slidably as are a spring 48 that biases this piston 47 to the washer 38 side and a rod 49 whose right end portion passes through the piston 47 fluid-tightly and slidably. Stopper ring 50 of the piston 47 is provided on the inner periphery of the left end portion of the piston guide 39. In the rod 49 are formed a hole 49a which is opened and closed by the valve 44 and a hole 49b which communicates with the drain chamber 51 communicating this hole 49a with the hole 35b and the rod 49 is biased by the spring 52 so that the hole 49a is closed by the valve 44. And the left end portion of the rod 49 is slidably fitted into the hole 53a in the piston 53 which is fitted into the closing member 40 fluid-tightly and slidably. The chamber 54 defined in the closing member 40 by the piston 53 communicates with the hole 40a in the closing member 40 and the hole 35d by way of the annular passage 61, thereby the fluid pressure generated by the brake master cylinder 2 being applied to this chamber 54. Because of the fluid pressure of the chamber 54 the piston 53 slides to the rod 49 side against the spring 52 and decreases the clearance 55 between the bottom surface of the hole 53a and the right end surface of the rod 49 to extinction to push the rod 49 leftward, moves the valve 44 and movable member 45 integrally with the rod 49 against the spring 46 after closing the hole 49a by the valve 44, lifts the valve 42 off the valve seat 37 against the working fluid pressure from the spring 43 and accumulator 29, and opens the hole 37a to introduce the working fluid pressure from the accumulator 29 to the chamber 56. The working fluid pressure of this chamber 56 acts so as to push the rod 46 and piston 47 rightward. Here, if the pushing force which acts upon the rod 49 exceeds the pushing force by the piston 53 and spring 52 before the pushing force which acts upon the piston 47 exceeds the pushing force of the spring 48 in the working fluid pressure increasing process of the chamber 56 because of the low fluid pressure applied to the chamber 54, the valve 42, movable member 45, valve 44, rod 49 and piston 53 move integrally rightward, the valve 42 comes into contact with the valve seat 37 first and the introduction of working fluid pressure supply from the accumulator 29 stops, then the movable member 45 strikes against the washer 38, the movement of the movable member 45 and valve 44 stops, the working fluid pressure rise stops, and the pressure starts lowering because the valve 44 opens the hole 49a in the rod 49 as a result of the movement of the rod 49. If the rod pushing force by the working fluid pressure of the chamber 56 becomes lower than the pushing force of the piston 53 and spring 52 again as a result of the decrease in this working fluid pressure, an action occurs to close the hole 49a by the valve 44 and lifts the valve 42 off the valve seat 37. By repeating these actions, the working fluid pressure of the chamber 56 is regulated to the fluid pressure of the chamber 54, that is, to a value proportional to the fluid pressure generated by the brake master cylinder 2 at the first specified ratio (cf. line B-C in FIG. 2). If the fluid pressure applied to the chamber 54 is high and the rightward pushing force exceeds the pushing force of the spring 48 but if the rightward pushing force of the rod 49 does not exceed the pushing force by the piston 53 and spring 52, the piston 47 slides rightward with respect to the rod 49, strikes against the collar section 49c of the rod 49 to push the rod 49 rightward. Thus, the force of the working fluid pressure of the chamber 56 pushing the rod 49 rightward becomes the resultant force of the force acting upon the rod 49 and the force acting upon the piston 47, and the piston 53, rod 49, valve 44, movable member 45, and valve 42 move rightward and leftward depending on the magnitude of this resultant force, force of the springs 43 and 46 and piston 53, and force of springs 48 and 52, and the working fluid pressure of the chamber 56 is regulated to a value proportional to the fluid pressure generated by the brake master cylinder 2 at the second specified ratio (cf. line C-D in FIG. 2).

The working fluid pressure of the chamber 56 is applied from the groove 38a provided in the washer 38 to the circuit 34 by way of the annular groove 35f of the body 35 and the hole 35c.

When no fluid pressure is applied to the chamber 54, the piston 53 is held by the spring 52 in the position shown in the drawing where its right end is in contact with the inside of the closing member 40 and a clearance 55 exists between the bottom surface of the hole 53a and the right end surface of the rod 49. In this condition, the valve operation mentioned above is carried out only by the spring 52 and the working fluid pressure of the chamber 56 is controlled at the specified fluid pressure (10-odd kg/cm$^2$) (cf. line A-B in FIG. 2).

In order to prevent the working fluid pressure fed by the accumulator from increasing over the maximum value of the predetermined range, relief valve 71 is disposed to valve seat 37 of regulator valve 33. When the working fluid pressure comes to increase over the maximum value of the predetermined range, the relief valve 71 opens the relief path by the working fluid pressure fed by the accumulator and releases the working fluid in the accumulator side to chamber 56, thereby preventing the increase of working fluid pressure at the accumulator side.

The working fluid pressure applied from the regulator valve 33 to the circuit 34 is applied from the hole 4e in the body 4 to the working fluid pressure chamber 20 on the left side of the pressure reducing piston 9 by way of a normally open solenoid valve 57. The solenoid valve 57 constitutes the aforementioned second valve together with the normally closed solenoid valve 59 which is provided in the circuit 58 that connects the circuit 34 between the solenoid valve 57 and the working fluid pressure chamber 20 and the drain circuit 36. That is, these solenoid valves 57 and 59 are connected to the electronic control 31 and the electronic control 31 normally does not operate both solenoid valves 57 and 59 and so supplies the working fluid pressure from the regulator valve 33 to the fluid pressure chamber 20, but when the wheels are about to be locked as detected by a signal from the rotation sensor 60 of the wheel at the time of braking, the electonic control operates both solenoid valves 57 and 59 to outflow the working fluid pressure in the working fluid pressure chamber 20 to the reservoir 25, eliminates the working fluid pressure from the pressure reducing piston 9, moves the pressure reducing piston 9 leftward by the fluid pressure of the reduced pressure chamber 10, closes the hole 5c with the valve 8 in its second position in contact with the valve seat 5 in its second position in the initial stage of the forward movement of the pressure reducing piston 9, and then increases the volume of the reduced pressure chamber 10 (constituting the fluid pressure circuit section on the side of the wheel brake cylinder) by the forward movement of the pressure reducing piston 9, and reduces the fluid pressure in the wheel brake cylinder 18, thereby reducing the braking force to the wheels.

When the rotational speed of the wheel has increased and the risk of the wheel being locked is eliminated, the electronic control 31 returns both solenoid valves 57 and 59 to their original positions, applies the working fluid pressure from the regulator valve 33 again to the working fluid pressure chamber, moves backward the pressure reducing piston 9 and reduces the volume of the reduced pressure chamber 10 to increase the fluid pressure in the wheel brake cylinder 18, and increases the braking force to the wheels. Since the electronic control 31 does not operate both solenoid valves 57 and 59 if the wheels are not locked by increased braking force to the wheels, the reduced pressure piston 9 moves backward to the stop position and the valve 8 is released from the valve seat 5 again. Incidentally, the solenoid valve 57 is sometimes operated temporarily and the increase in the fluid pressure in the fluid pressure chamber 10 may be stopped by increased rotational speed of the wheel during the backward movement of the pressure reducing piston 9 depending on the construction of the electronic control 31.

Figure 2:
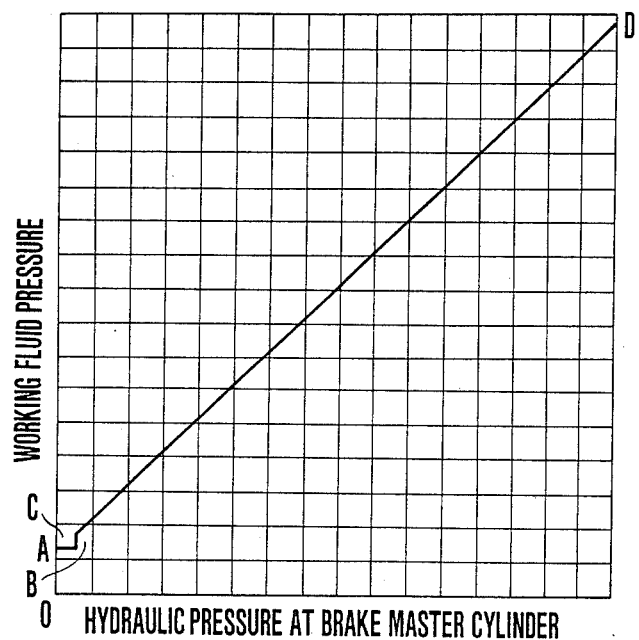
FIG. 2 shows the characteristic curve of the system of FIG. 1.

Since the working fluid pressure indicated with the A-B line in FIG. 2 is applied from the accumulator 29 to the circuit 34 by the operation of the regulator valve 33 when the brake pedal 1 is released during the backward movement of the pressure reducing piston 9 as described above, the pressure reducing piston 9 is always moved back to the stop position by the same working fluid pressure. The working fluid pressure applied by the regulator valve 33 to the circuit 34 is also applied from the circuit 34 to the chamber 22 by way of the hole 4g in the body 4—annular groove 4f—hole 13a in the closing member 13. When the working fluid pressure is not present, for example, when the specified working fluid pressure cannot be obtained because of the failure of the pump 23 or the failure of the accumulator 29, the reduced pressure piston 9 is moved forward by the fluid pressure of the reduced pressure chamber 10 at the time of braking and the valve 8 comes into contact with the valve seat 5 to close the hole 5c because the working fluid pressure is not supplied to the working fluid pressure chamber 20 on the left side of the pressure reducing piston 9, but since the working fluid pressure is not applied to the chamber 22 on the left side of the piston 14 either, the valve 16 is released from the valve seat 7 by the spring 19 to open the hole 7a and is brought into contact with the valve seat 11 to close the hole 11b, so that the fluid pressure applied from the brake master cylinder 2 to the valve chamber 6 is applied to the valve chamber 15 by way of the hole 7a in the valve seat, thereby braking being activated. Since the reduced pressure chamber 10 and chamber 12 are isolated from the valve chambers 6 and 15 by the operation of the valves 8 and 16 at this time, the fluid from the brake master cylinder 2 will not be wasted by these chambers 10 and 12.

A floating piston section 62 is provided to produce optimum vibration of the braking pedal 1 when the anti-skid operates as mentioned above. This floating piston section 62 has the first floating piston 65 fitted to the large-diameter portion 64a of the cylinder bore 64 in the body 63 imperviously to fluid and slidably, the second floating piston 66 fitted imperviously to fluid and slidably to the inside diameter of the first floating piston 65, and the first spring 67 and second spring 68 which bias the first floating piston 65 and the second floating piston 66 upward respectively a shown in FIG. 1. The fluid pressure chamber 69 formed above these two floating pistons 65 and 66 communicates with the circuit 3, and the fluid pressure chamber 70 below communicates with the circuit 17. Therefore, when the anti-skid has operated, a downward force is produced in each floating piston 65 and 66 by the difference between the fluid pressure on the side of the brake master cylinder and the fluid pressure on the side of the wheel brake cylinder. The fluid pressure difference required to slide the first floating piston 65 downwardly against the first spring 67 is set lower than the fluid pressure difference required to slide the second floating piston 66 downwardly against the second spring 68 and the piston is reciprocated up and down in the cylinder hole large-diameter portion 64a by the relatively small fluid pressure difference and its variation observed when the anti-skid operates on abroad surface resistant to sliding. And the fluid pressure difference required to slide the second floating piston 66 downwardly against the first spring 68 is so set that the piston is reciprocated up and down by a large fluid pressure difference and its variation observed when the anti-skid operates on an easily sliding road surface. And the reciprocating movement of the floating pistons 65 and 66 changes the volume of the fluid pressure circuit section on the side of the brake master cylinder and vibrates the brake pedal 1.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. An anti-skid device for motor vehicles, comprising:
   a hydraulic circuit connecting a brake master cylinder with a wheel brake cylinder;
   a first valve disposed in said hydraulic circuit and dividing said hydraulic circuit into a brake master cylinder side hydraulic circuit and a wheel brake cylinder side hydraulic circuit, said first valve being movable between a first position wherein said master cylinder side hydraulic circuit and said wheel brake cylinder side hydraulic circuit have substantially the same pressure, and a second position wherein said wheel brake cylinder side hydraulic circuit has substantially less pressure than does said master cylinder side hydraulic circuit;
   an electric motor;
   a pump for generating working fluid pressure, wherein said pump is connected to an output of said motor such that said pump is driven by said motor;
   an accumulator communicating with an output of said pump for accumulating working fluid pressure generated by said pump;
   a pressure reducing piston movable between an inactive position in engagement with said first valve for maintaining said first valve in said first position, and an active position out of engagement with said first valve whereby said first valve can assume said second position and the capacity of said wheel brake cylinder side hydraulic circuit is increased, said pressure reducing piston including means for assuming said inactive position in response to the application of the working fluid pressure to said pressure reducing piston;

a second valve comprising means for supplying said working fluid pressure to said pressure reducing piston when a motor vehicle wheel associated with said wheel brake cylinder side hydraulic circuit is rotating in a normal condition, said second valve also comprising means for releasing said working fluid pressure from said pressure reducing piston when locking of the wheel is imminent, whereby said pressure reducing piston can move to said active postion so that said first valve can move to said second position in which said wheel brake cylinder side hydraulic circuit has substantially less pressure than does said master cylinder side hydraulic circuit;

a first floating piston having opposing sides respectively in communication with said master cylinder side hydraulic circuit and said wheel brake cylinder side hydraulic circuit;

a first spring biasing said first floating piston in opposition to hydraulic pressure from said brake master cylinder side hydraulic circuit, whereby said first floating piston is slidable by a predetermined degree in response to the hydraulic pressure of said brake master cylinder side hydraulic circuit acting against the hydraulic pressure of said wheel brake cylinder side hydraulic circuit and said first spring;

a second floating piston having opposing sides respectively communicating with said brake master cylinder side hydraulic circuit and said wheel brake cylinder side hydraulic circuit; and a second spring biasing said second floating piston in opposition to said hydraulic pressure of said brake master cylinder side hydraulic circuit, whereby said second floating piston is slidable by a predetermined degree in response to said hydraulic pressure of said brake master cylinder side hydraulic circuit acting against said hydraulic pressure of said wheel brake cylinder side hydraulic circuit and said second spring.

2. An anti-skid device for motor vehicles of claim 1, wherein said first and second floating pistons and said first and second springs are constructed such that a degree of difference of hydraulic pressure between said brake master cylinder side hydraulic circit and said wheel brake cylinder side hydraulic circuit sufficient for causing a sliding movement of said first floating piston against the force of said first spring is smaller than that necessary for causing a sliding movement of said second floating piston against the force of said second spring.

3. An anti-skid device for motor vehicles of claim 1, wherein the second floating piston is fitted slidably and fluid-tightly into an internal bore of said first floating piston.

4. An anti-skid device for motor vehicles of claim 1 including a regulator valve having means for controlling said working fluid pressure to be proportional to the pressure of said brake master cylinder side hydraulic circuit.

5. An anti-skid device of claim 4, wherein said second valve comprises a first solenoid valve of a normally open type disposed in a hydraulic circuit between said regulator valve and the pressure reducing piston and; a second solenoid valve of a normally-closed type disposed in a hydraulic circuit connecting a drain circuit and a hydraulic circuit between said first solenoid valve and the pressure reducing piston.

* * * * *